(12) United States Patent
Sahoo et al.

(10) Patent No.: US 12,406,414 B2
(45) Date of Patent: Sep. 2, 2025

(54) BUILDING MANAGEMENT SYSTEM WITH AUDIOVISUAL DYNAMIC AND INTERACTIVE FAULT PRESENTATION INTERFACES

(71) Applicant: Tyco Fire & Security GmbH, Neuhausen am Rheinfall (CH)

(72) Inventors: Rakesh Ranjan Sahoo, Khordha (IN); Mohan J. Shelar, Satara (IN); Kathiresan Rajagopal, Thane (IN); Lawrence Dsouza, Dombivali-East (IN); Sk Sartaj Ansari, Purulia (IN); Renuka Sonnekar, Parbhani (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 182 days.

(21) Appl. No.: 17/896,420

(22) Filed: Aug. 26, 2022

(65) Prior Publication Data

US 2024/0070942 A1 Feb. 29, 2024

(51) Int. Cl.
| | | |
|---|---|---|
| G06T 11/20 | (2006.01) | |
| G05B 23/02 | (2006.01) | |
| G06F 3/0484 | (2022.01) | |
| G06F 3/16 | (2006.01) | |

(52) U.S. Cl.
CPC ........ *G06T 11/206* (2013.01); *G05B 23/0216* (2013.01); *G06F 3/16* (2013.01); *G05B 2223/06* (2018.08); *G06F 3/0484* (2013.01); *G06T 2200/24* (2013.01)

(58) Field of Classification Search
CPC ........ G06T 11/206; G06F 3/16; G06F 3/0484; G05B 23/0216
See application file for complete search history.

(56) References Cited

U.S. PATENT DOCUMENTS

| | | | | |
|---|---|---|---|---|
| 6,114,950 | A * | 9/2000 | Schaible | B60Q 9/007 340/901 |
| 10,656,805 | B2 * | 5/2020 | Mehta | G05B 23/0272 |
| 11,727,335 | B2 * | 8/2023 | Bhattacharya | G06F 3/0482 705/7.39 |
| 2004/0239693 | A1 * | 12/2004 | Mullen | G06T 11/60 345/677 |
| 2016/0171846 | A1 * | 6/2016 | Brav | G08B 6/00 340/407.1 |
| 2017/0212482 | A1 * | 7/2017 | Boettcher | H02J 13/00002 |
| 2017/0212668 | A1 * | 7/2017 | Shah | G06F 3/0486 |
| 2018/0340702 | A9 | 11/2018 | Turney et al. | |
| 2019/0033803 | A1 | 1/2019 | Chatterjee et al. | |
| 2019/0034309 | A1 | 1/2019 | Nayak et al. | |
| 2020/0125059 | A1 | 4/2020 | Drees | |
| 2020/0159723 | A1 * | 5/2020 | Goyal | G05B 15/02 |
| 2020/0200420 | A1 | 6/2020 | Nayak et al. | |

FOREIGN PATENT DOCUMENTS

CN 110686329 A 1/2020

* cited by examiner

*Primary Examiner* — Sing-Wai Wu
(74) *Attorney, Agent, or Firm* — Foley & Lardner LLP

(57) ABSTRACT

A method for a building management system includes detecting a fault from timeseries building data, classifying a time period of the timeseries building data as a faulty time period based on the fault, and playing an audiovisual presentation of the fault and the timeseries building data by visually advancing through the timeseries building data in a chronological order and emitting a tone when the timeseries building data for the faulty time period is presented.

13 Claims, 9 Drawing Sheets

BUILDING MANAGEMENT SYSTEM WITH AUDIOVISUAL DYNAMIC AND INTERACTIVE FAULT PRESENTATION INTERFACES

BACKGROUND

The present disclosure relates generally to the field of building management systems (BMSs). A BMS is, in general, a system of devices configured to control, monitor, and manage equipment in or around a building. A BMS can include, for example, a HVAC system, a security system, a lighting system, a fire alerting system, any other system that is capable of managing building functions or devices, or any combination thereof. A BMS can include tools for communicating building data and insights to a user.

Operation of building equipment is largely opaque to human technicians, because, among other reasons, equipment is located in hard-to-access areas (building plenums, rooftops, behind walls, etc.) often remote from skilled technicians, various conditions/states/etc. are not sensible by a human at sufficient resolution for detailed analysis (e.g., humidity, temperature, vibrations, fan speeds, etc.), building timeseries data can include a larger number of points with values provided at a higher frequency than can be directly handled by a human in real-time, etc. Accordingly, it is inherently technical problem to collect, arrange, and present building timeseries data relating to building equipment and/or building management systems in an understandable, accessible, and insightful manner. Inelegant presentation of mass building data can obscure relevant information, confuse expert technicians, and otherwise not address the inherent technical challenges of monitoring data for useful insights into equipment performance. Computer-machine interface design which overwhelms the user is also a technical downfall of such systems which should be avoided.

SUMMARY

One implementation of the present disclosure is a method for a building management system. The method includes detecting a fault from timeseries building data, classifying a time period of the timeseries building data as a faulty time period responsive to detecting the fault, playing an audiovisual presentation of the fault and the timeseries building data by visually advancing through the timeseries building data in a chronological order such that at least a normal time period and the faulty time period are presented at different times and emitting an audio tone when the timeseries building data for the faulty time period is presented.

In some embodiments, the method includes determining a quality of the tone based on a type or severity of the fault. The quality of the tone may include a pitch or volume of the tone. In some embodiments, a pitch of the tone is a function of an amount of deviation of a point of the timeseries building data from a target or threshold value for the point. In some embodiments, playing the audiovisual presentation is performed via a screen and a speaker, and wherein visually advancing the timeseries building data comprises moving a chart of the timeseries building data across the screen, wherein a width of the chart exceeds a width of the screen. In some embodiments, the method includes stopping the tone when the presentation advances such that the timeseries building data is no longer presented.

Another implementation of the present disclosure is a method. The method includes determining a data loss subperiod, a fault subperiod, and a normal subperiod of a time period for a point of timeseries building data. The method also includes displaying a graph that includes a line plot of the point. The line plot has a first visual characteristic in the data loss subperiod, the line plot has a second visual characteristic in the fault subperiod, and the line plot has a third visual characteristic in the normal subperiod.

In some embodiments, the method also includes hiding, in response to selection of a corresponding option by a user, the line plot for at least one of the data loss subperiod, the fault subperiod, or the normal subperiod. In some embodiments, the method also includes adding or removing, in response to selection of a corresponding option by a user, gridlines from the graph. In some embodiments, the method also includes displaying numerical percentages of the time period associated respectively with the data loss subperiod, the fault subperiod, and the normal subperiod.

In some embodiments, the line plot corresponds to a first unit of building equipment and the graph also includes an additional line plot corresponding to a second unit of building equipment. In some embodiments, the method also includes displaying a date and day of week associated with the timeseries building data. In some embodiments, the method also includes calculating statistical metrics associated with the timeseries data and displaying the statistical metrics in response to a one-click request input by a user.

In some embodiments, the time period corresponds to a first fault of a plurality of faults. The method can include receiving a request to navigate to a view of a second fault of the plurality of faults and changing the graph from the line plot to an additional line plot for an additional time period corresponding to a second fault of the plurality of faults. In some embodiments, the graph also includes a fault rule line indicating a threshold or target value for the point such that the line plot of the point is visually comparable to the fault rule line.

Another implementation of the present disclosure is one or more non-transitory computer-readable media storing program instructions that, when executed by one or more processors, cause the one or more processors to perform operations. The operations include detecting a fault from timeseries building data, classifying a time period of the timeseries building data as a faulty time period based on the fault, playing an audiovisual presentation of the fault and the timeseries building data by visually advancing through the timeseries building data in a chronological order and emitting a tone when the timeseries building data for the faulty time period is presented.

In some embodiments, the operations also include determining a pitch of the tone based on a type or severity of the fault. The pitch of the tone may be a function of an amount of deviation of a point of the timeseries building data from a threshold or target value for the point. In some embodiments, the operations also include playing the audiovisual presentation by controlling a screen and a speaker. Visually advancing the timeseries building data can include moving a chart of the timeseries building data across the screen while a width of the chart exceeds a width of the screen. In some embodiments, the operations also include stopping the tone when the timeseries building data for the faulty time series is advanced such that the timeseries building data is no longer presented.

BRIEF DESCRIPTION OF THE DRAWINGS

Various objects, aspects, features, and advantages of the disclosure will become more apparent and better understood by referring to the detailed description taken in conjunction

DETAILED DESCRIPTION

Building HVAC Systems and Building Management Systems

Figure 1:
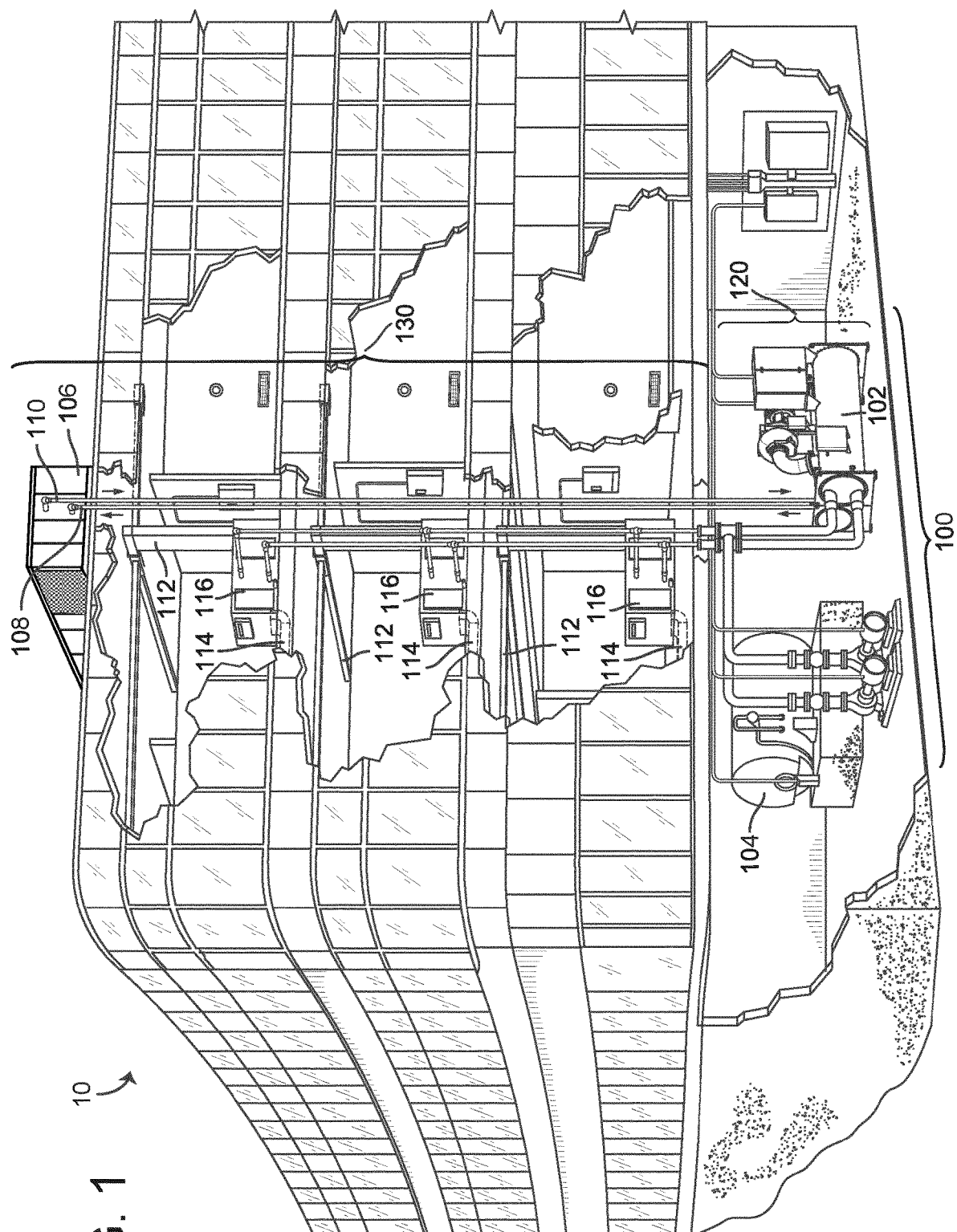
FIG. 1 is a drawing of a building equipped with a HVAC system, according to some embodiments.
Figure 2:
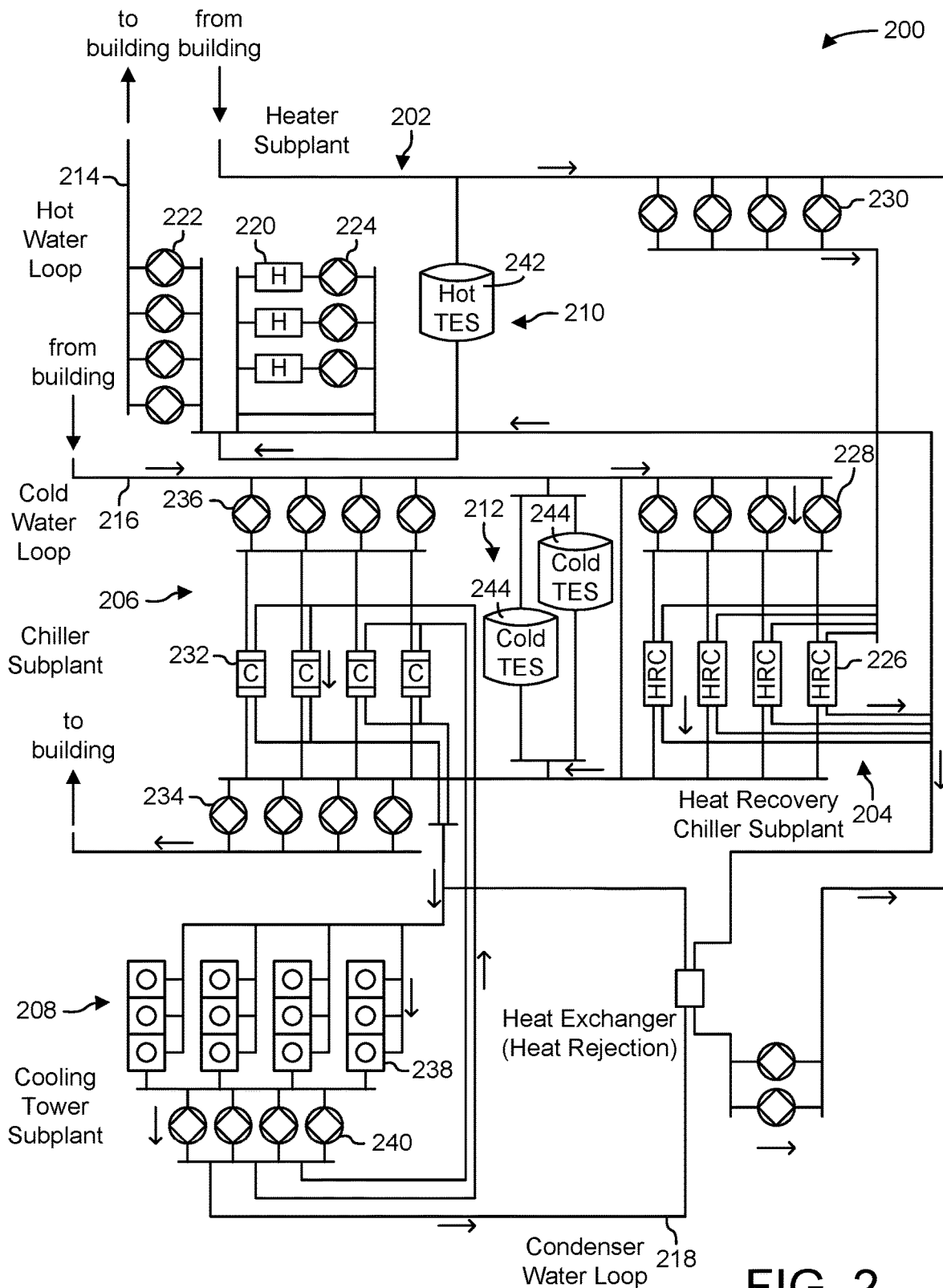
FIG. 2 is a block diagram of a waterside system that may be used in conjunction with the building of FIG. 1, according to some embodiments.
Figure 3:
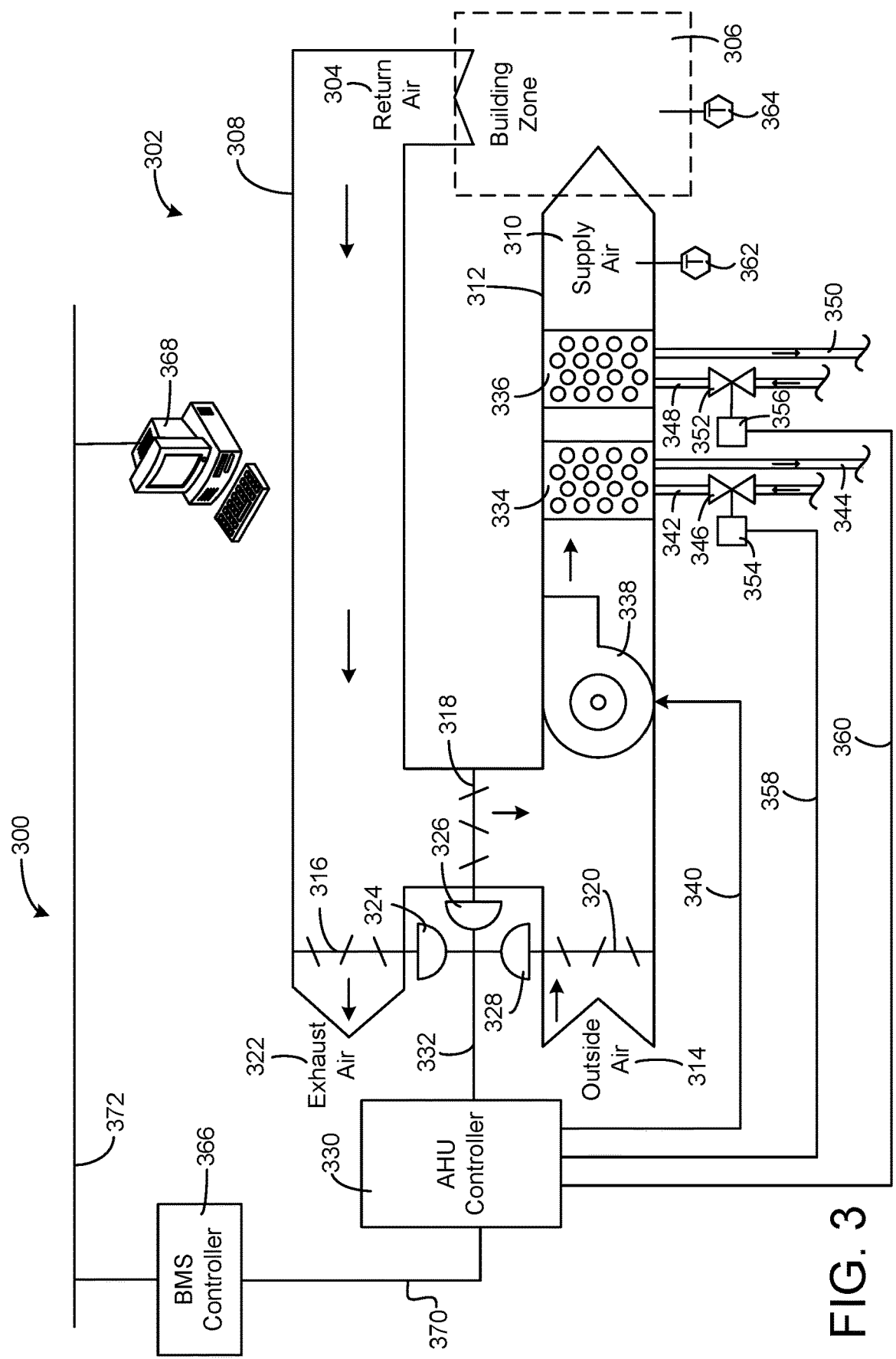
FIG. 3 is a block diagram of an airside system that may be used in conjunction with the building of FIG. 1, according to some embodiments.
Figure 4:
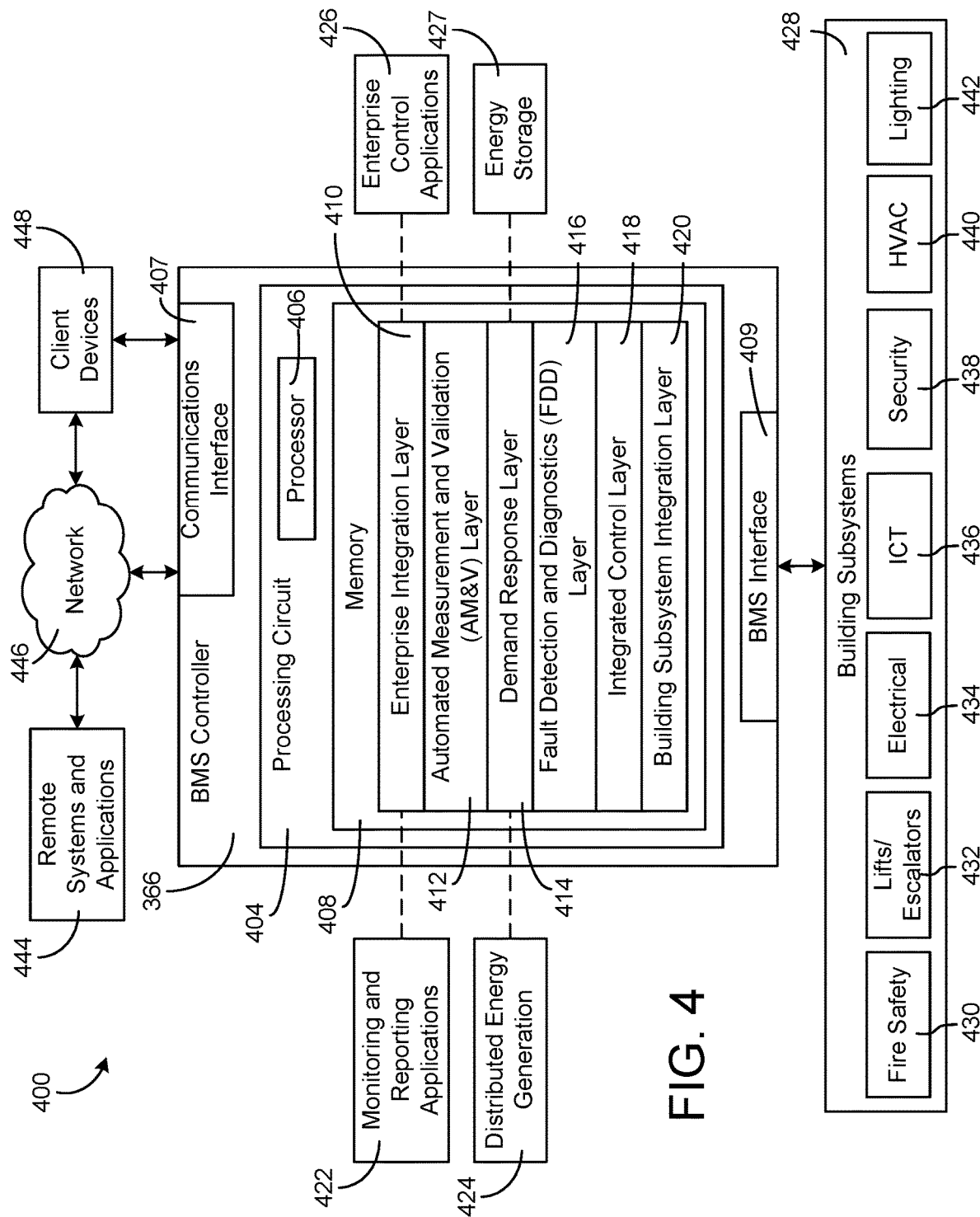
FIG. 4 is a block diagram of a building management system (BMS) that may be used to monitor and/or control the building of FIG. 1, according to some embodiments.
Figure 5:
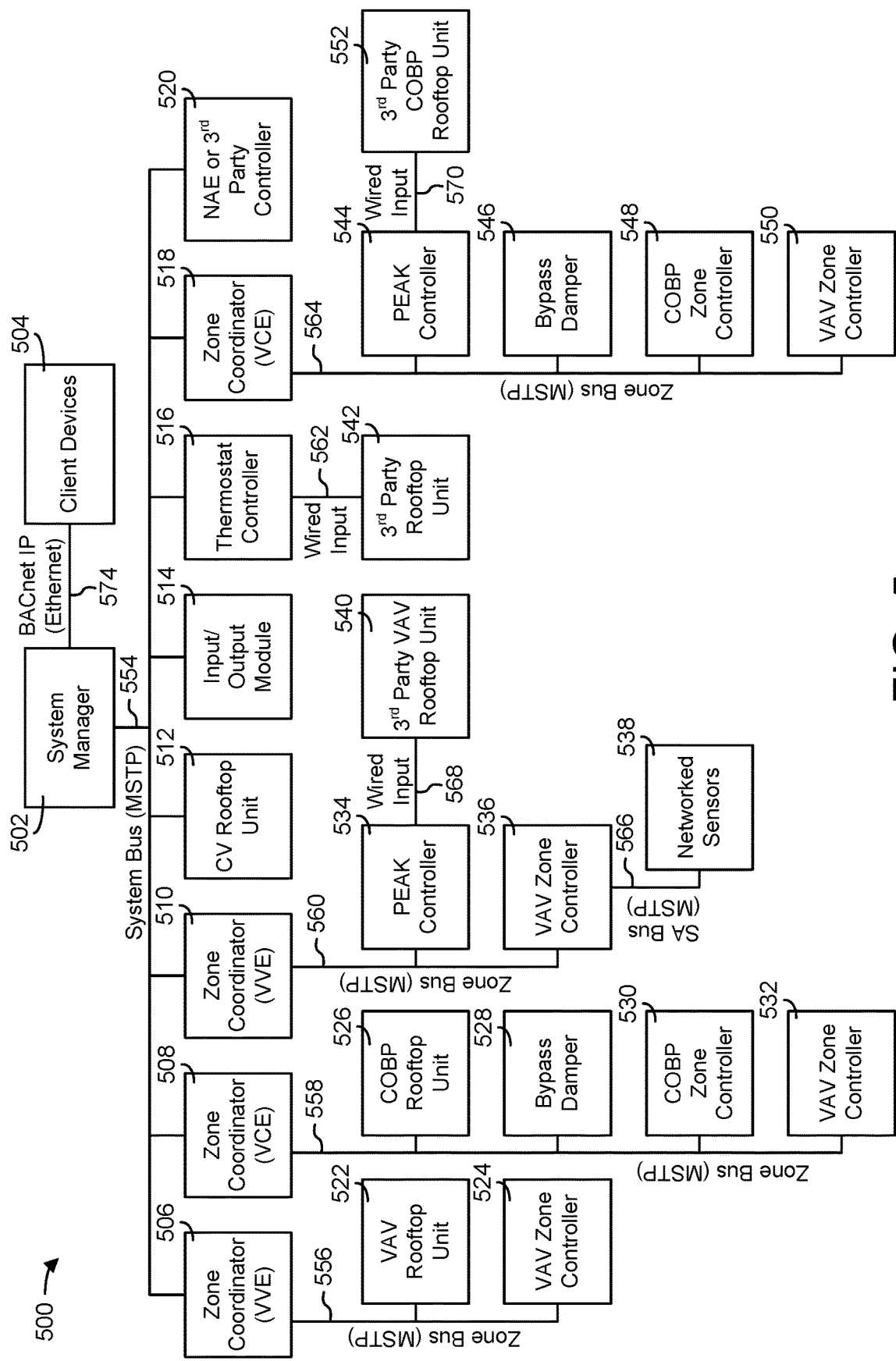
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire safety system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants Based on the particular configuration of waterside system 200 and the types of loads served by waterside system 200.

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-Based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-Based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Referring now to FIG. 4, a block diagram of a building management system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-Based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 Based on the inputs, generate control signals Based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) Based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be Based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs Based on one or more inputs representative of or Based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or Based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super-system. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels Based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

BMS with Audiovisual Dynamic and Interactive Fault Presentation Interfaces

Operation of building equipment is largely opaque to human technicians, because, among other reasons, equipment is located in hard-to-access areas (building plenums, rooftops, behind walls, etc.) often remote from skilled technicians, various conditions/states/etc. are not sensible by a human at sufficient resolution for detailed analysis (e.g., humidity, temperature, vibrations, fan speeds, etc.), building timeseries data can include a larger number of points with values provided at a higher frequency than can be directly handled by a human in real-time, etc. Accordingly, it is inherently technical problem to collect, arrange, and present building timeseries data relating to building equipment and/or building management systems in an understandable, accessible, and insightful manner. Inelegant presentation of mass building data can obscure relevant information, confuse expert technicians, and otherwise not address the inherent technical challenges of monitoring data for useful insights into equipment performance. Computer-machine interface design which overwhelms the user is also a technical downfall of such systems which should be avoided. The examples of FIGS. 6-7 provide technical solutions to such inherent challenges of monitoring building equipment, including by transforming building data into a form having real, valuable utility as will be clear from the Figures and the following description.

Figure 6:
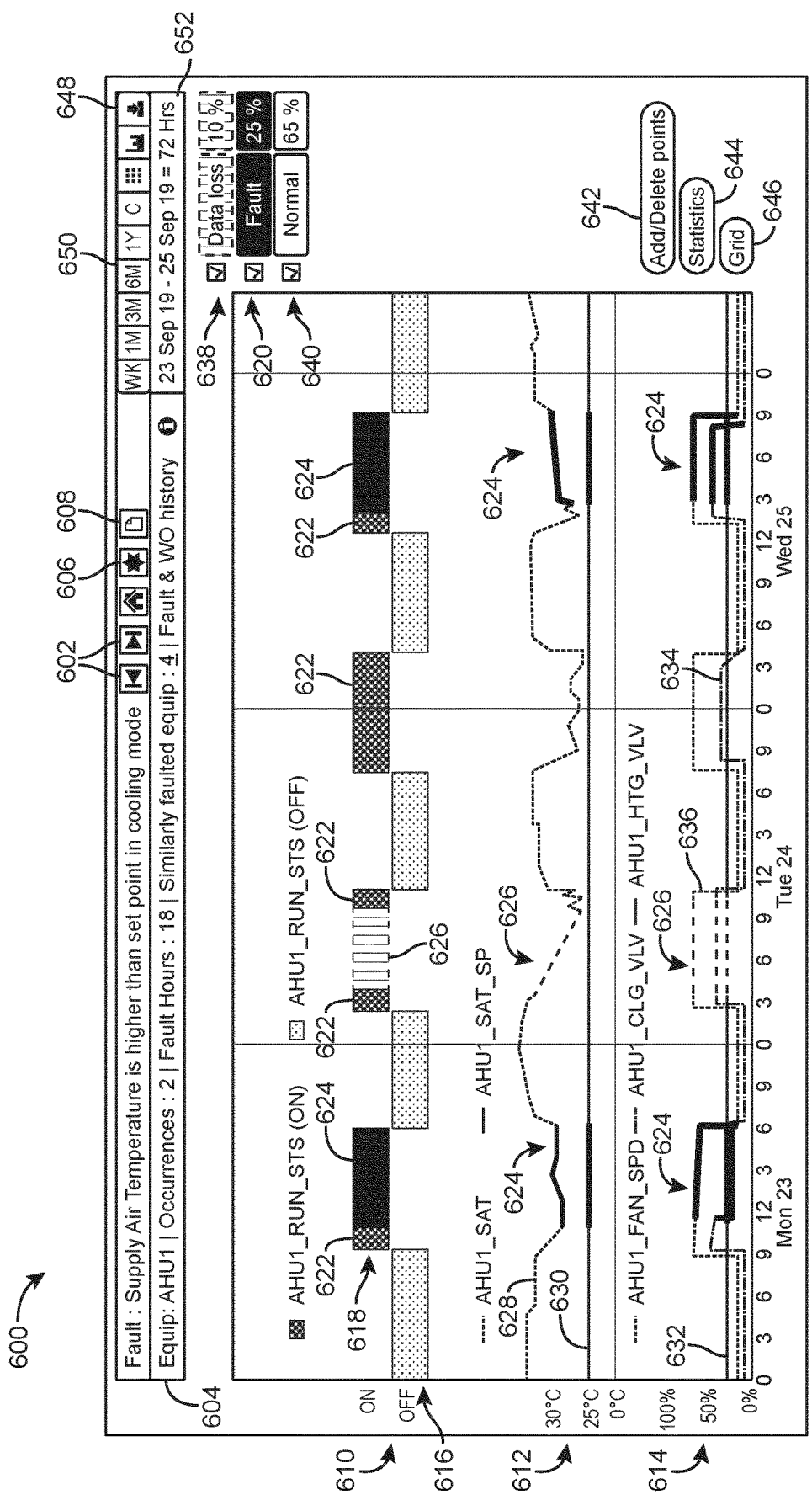
FIG. 6 is an illustration of a graphical user interface associated with a BMS, according to some embodiments.

Referring now to FIG. 6, a graphical user interface 600 is shown, according to some embodiments. The graphical user interface 600 can be presented on a client device (e.g., client device 368, client device 448, client device 504) and can be generated by a building management system, for example by BMS controller 366 (e.g., by fault detection and diagnostics layer 416), by monitoring and reporting applications 422, and/or by system manager 502 in various embodiments. In some embodiments, the graphical user interface 600 is generated by a cloud-based computing resource and is accessible via the Internet (e.g., via an Internet browser on a client device).

The graphical user interface 600 is configured to display building timeseries data for multiple points over a time period corresponding to a detected fault. In the example shown, the fault is labeled as "Supply Air Temperature is higher than set point in cooling mode." The graphical user interface 600 can be adapted to visualize building time series data corresponding to various other types of fault, for example by navigating to another fault using arrows 602. A header 604 identifies the relevant unit of equipment for which the fault occurred and for which data is shown, the number of occurrences of the fault in the view shown, the number of fault hours (e.g., duration of time in a fault state), and a number of similarly faulted equipment (e.g., a count of other units of equipment with the same type of fault). The number of similarly faulted equipment may be provided as an interactive link to detailed views, further information, etc. related to the similarly-faulted equipment which may cause the graphical user interface 600 to navigate to another view displaying such information when clicked or selected. The displayed fault can be saved as a favorite (bookmarked, etc.) by selecting the favorites button 606, allowing quick navigation back to the displayed view at a later time.

Selection of a comment button 608 causes the graphical user interface 600 to provide a window, field, etc. allowing free-text entry of comments by a user, for example to allow the user to provide comments on the displayed fault. The comments can be saved and later displayed by a subsequent selection of the comment button 608.

The graphical user interface 600 is shown as including multiple graphs of building timeseries data, shows as a first graph 610, a second graph 612, and a third graph 614. The first graph 610, the second graph 612, and the third graph 614 may illustrate different points (e.g., measured variables, setpoints, statuses, etc.) of building timeseries data for a same time period. The first graph 610, the second graph 612, and the third graph 614 are aligned with a shared horizontal axis showing the times corresponding to the data plotted on the graphs 610-614. The horizontal axis may be labelled with hours, dates, and day of week. Easy comparisons, connections, etc. can thus be made across the graphs 610-

614 and across days (e.g., with day of week information distinguishing week days and weekends, etc.). Other day-typing information can be included in various embodiments (e.g., business day, remote work day, holiday, weekend, school day, etc.). Each of the graphs 610-614 may have a different vertical axis, shown as on/off in the first graph 610, ° C. in the second graph 612, and % in the third graph 614, corresponding to the unit of measure of the points displayed in each of the graphs 610-614. Different points that have the same unit of measure can be presented within the same graph (e.g., one of the graphs 610-614), whereas different points that have different units of measure can be presented in different graphs.

The first graph 610 is shown as displaying runtime (on/off) data for an air handling unit. Blocks 616 represent times at which the air handling unit is off. Blocks 618 represent times at which the air handling unit is on. The blocks 618 are coded according to key 620 to indicate times at which the equipment is operating normally (periods 622, for example shown in green), operating in a fault state (periods 624, for example shown in red), and for which data is not available (period 626, shown as broken/dashed illustrating data loss). A person viewing the first graph 610 can then easily see when the equipment was off, when the equipment was running, and the fault and/or data loss status of the equipment across the displayed time period.

The second graph 612 is shown as including a first line plot 628 and a second line plot 630. The first line plot 628 visualizes measurements of a physical condition of a building or equipment unit, shown in the example of FIG. 6 as a supply air temperature of an air handling unit. The second line plot 630 visualizes a setpoint for the condition plotted by the first line plot 628. In the example of FIG. 6, the second line plot 630 shows a supply air temperature setpoint for the air handling unit. The second graph 612 thus allows a user to easily observe how well the setpoint tracked the setpoint over a time period.

The first line plot 628 and the second line plot 630 are coded by color, line type, dashing, etc. to show normal operating periods, fault periods (shown as periods 624), and data loss periods (shown as periods 626). The fault periods may be colored differently (e.g., red) compared to the normal periods (e.g., blue, green), and the data loss periods may be dashed, dotted, etc. As shown in FIG. 6, for the data loss period 626 the first line plot 628 is estimated (interpolated, etc.) as a straight line between the last point before data loss and the first point after data loss (once data becomes available again), with the linear data loss periods 626 included in the graph. The second graph 612 thereby directly illustrates, in a clear manner, both point values and status information.

The third graph 614 includes a third line plot 632, a fourth line plot 634, and a fifth line plot 636, having similar color-coding and/or dashing as for the second graph 612 to illustrate fault periods 624 and data loss periods 626 as distinct from one another and from normal operating periods. Third graph 614 has a percentage (e.g., 0% to 100%) as the unit on the vertical axis, with the third line plot 632, the fourth line plot 634, and the fifth line plot 636 plotting equipment operating points as percentage values. In the example shown, the third line plot 632 plots the open/close position of a first valve or damper, the fourth line plot 634 plots the open/close position of a second valve or damper, and the fifth line plot 636 plots a fan speed. Other values can be plotted in various embodiments, for example as may be suitable to visualize performance of various types of equipment. The third graph 614 demonstrates that multiple points which have the same units can be grouped on the same graph for comparison and space-savings.

The key 620 of the graphical user interface 600 is shown as indicating the colors or other characteristics used in the graphs 610, 612, 614. The key 620 also includes check boxes 638, which can be selected/deselected by a user in order to show/hide data for the corresponding category. As shown, three check boxes 638 are selected and data for three categories (data loss, fault, normal) is shown in the graphs 610, 612, 614. When one or more of the check boxes is deselected, the graphs 610, 612, 614 will update to hide (not show) data for the corresponding category or categories. The graphical user interface 600 thereby can be adjusted on command to hide data loss segments, hide faulty data, and/or hide normal data. The key 620 is further shown as showing percentages 640 for the categories indicating the percentages of the total time period displayed associated with each of the data loss period(s), fault period(s), and normal period(s).

The graphical user interface 600 is also shown as including an add/delete points button 642. The add/delete points button 642 is selectable to provide options to add/delete points form the graphs 610, 612, 614, thereby enabling user customization of the displayed points. One or more of the graphs 610, 612, 614 can be automatically updated in response to a user request to add or delete a point.

The graphical user interface 600 is also shown as including a statistics button 644. In response to selection of the statistics button 644, statistical analysis of the building timeseries data can be displayed. For example, display of statistical analysis can include flagging anomalies in fault and normal data, showing a minimum value of a variable, showing a maximum value of a variable, showing 25% and 75% quartiles, showing a percentage of data loss, etc. Such statistical analyses are advantageously automatically performed for easily-accessible display directly in the graphical user interface 600.

The graphical user interface 600 is also shown as including a grid button 646. The grid button 646 is selectable to show or hide grid lines of the graphs 610, 612, 614. Grid lines show even steps of units for both the horizontal and vertical axes across the whole graph area to improve the ability of a viewer to assess plotted values throughout the graphs 610, 612, 614. Grid lines can include horizontal and vertical lines. As shown, for example, vertical lines can be provided for each 3-hour increment along the horizontal axis. Horizontal lines can also be provided, for example in increments of 25% or 50% (for plotted percentages), one degree or five degrees (for plotted temperature), etc. Grid lines can also be hidden by selection of the grid button 646 if a more open view is preferred by a user.

The graphical user interface 600 also includes an export button 648. The export button allows the user to export the graphical user interface 600 (or some reformatted version thereof), for example as an image (e.g., .png file), .xml file, .pdf file, and/or other format. The exported version retains the coloring, dashing, etc. of the graphs 610, 612, 614 as shown. Exporting to various file formats may be enable users to save and share results in a manner convenient to them and or convenient to other persons who may not have direct access to the graphical user interface 600.

The graphical user interface 600 is shown to include several time range selection buttons 650 which can be selected to adjust the range of time shown in the graphs 610-614. For example, the time range selection buttons 650 are shown to include buttons labeled "WK" (one week), "1M" (one month), "3M" (three months), "6M" (six months), "1Y" (one year), and "C" (custom) which indicate different ranges of time which can be represented in the graphs 610-614. A user can select any of the time range selection buttons 650 to cause the graphical user interface 600 to display a longer or shorter period of the timeseries data (e.g., changing the duration of the time window shown in the graphs 610-614 to effectively "zoom in" or "zoom out" on the timeseries data) or move the time window forward or backward in time (e.g., retain the same duration of the time window but slide the time window toward the past or future to show a different portion of the timeseries data). In some embodiments, selecting the custom time range button "C" may allow a user to define a custom time period via the custom time period input fields 652 by defining the beginning time of the custom time period (shown as "23 Sep 19" in FIG. 6), the end time of the custom time period (shown as "25 Sep 19" in FIG. 6), and/or the duration of the custom time period (shown as "72 Hrs" in FIG. 6). Entering a custom time range via the custom time period input fields 652 may cause the graphical user interface 600 to move the time window forward or backward in time and/or expand or contract the duration of the time window shown in the graphs 610-614 to correspond to the custom time range.

Figure 7A:
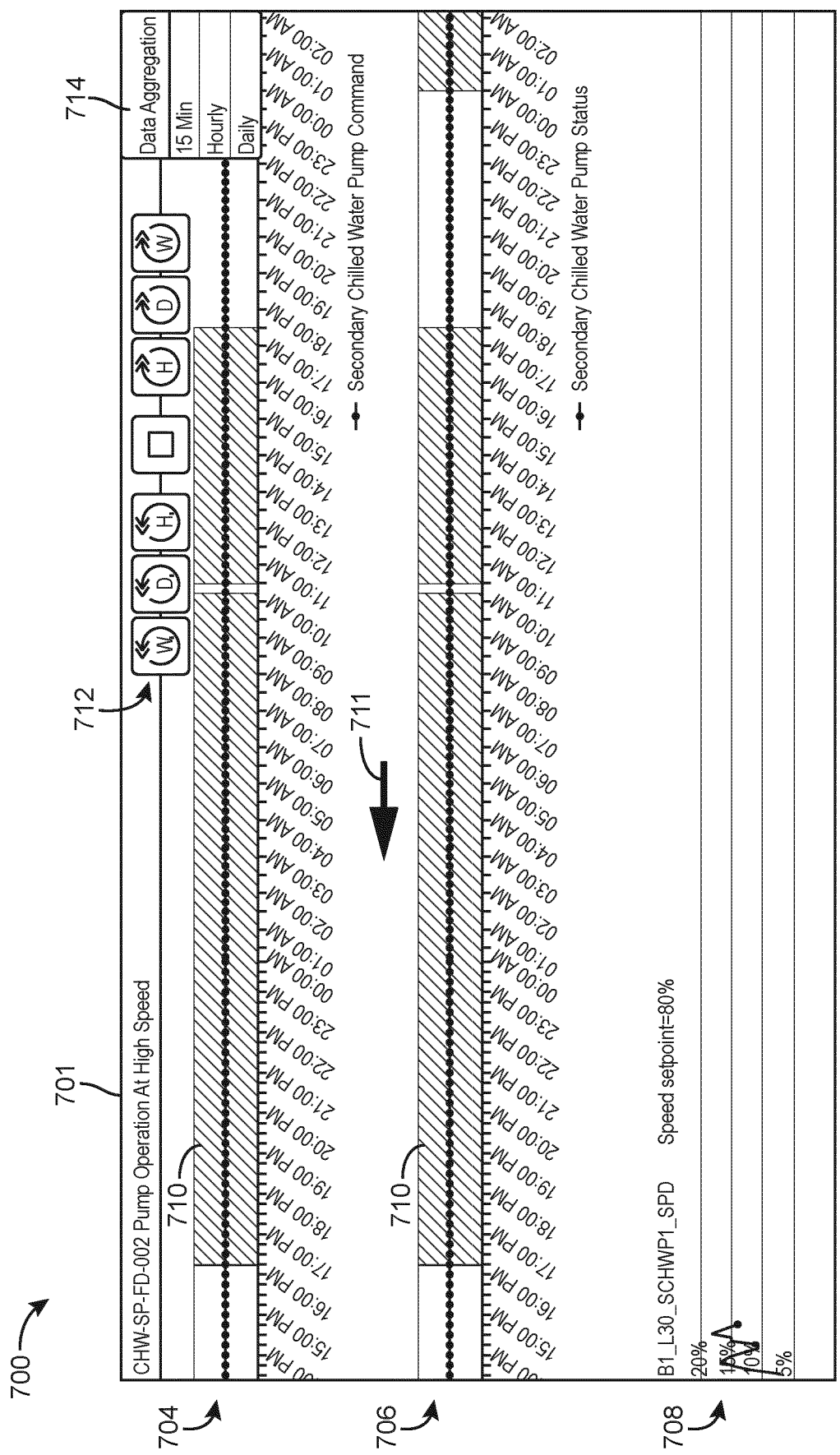
FIG. 7A is a first frame of a storyboard-style illustration of another graphical user interface associated with a BMS, according to some embodiments.
Figure 7B:
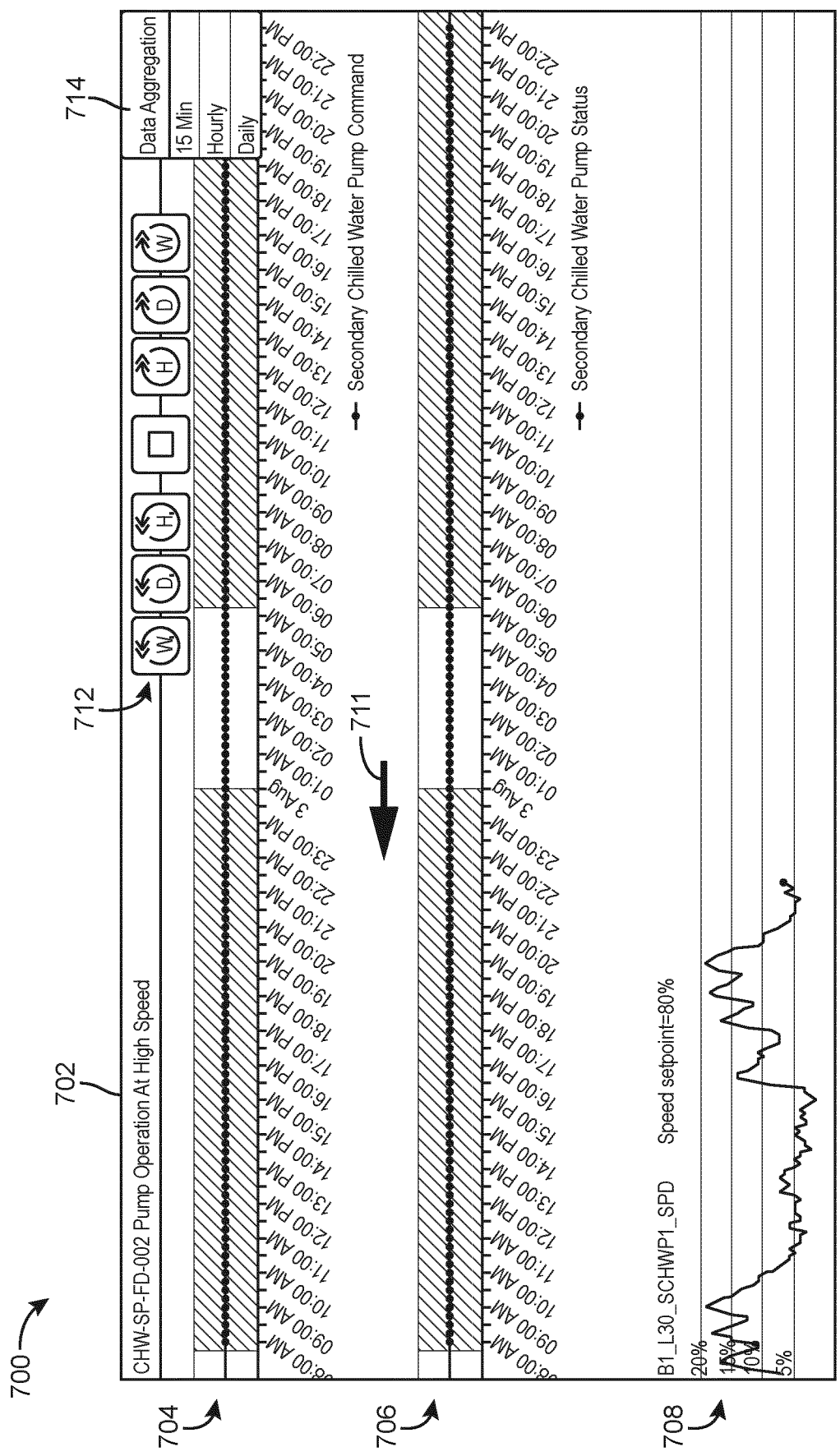
FIG. 7B a second frame of a storyboard-style illustration of another graphical user interface associated with a BMS, according to some embodiments.

Referring now to FIGS. 7A-B, a storyboard-style illustration of a graphical user interface 700 is shown, according to some embodiments. The graphical user interface 700 can be presented on a client device (e.g., client device 368, client device 448, client device 504) and can be generated by a building management system, for example by BMS controller 366 (e.g., by fault detection and diagnostics layer 416), by monitoring and reporting applications 422, and/or by system manager 502 in various embodiments. In some embodiments, the graphical user interface 700 is generated by a cloud-based computing resource and is accessible via the Internet (e.g., via an Internet browser on a client device).

FIG. 7A includes a first frame 701 and FIG. 7B includes a second frame 702, showing the graphical user interface 700 at different points at time, for example with the second frame 702 showing a view which is provided subsequent to the view shown in the first frame 701. FIGS. 7A-B illustrate that the graphical user interface 700 provides a dynamic audiovisual presentation in which visualizations of building timeseries data play as a presentation, video, etc. and which may include audio cues (e.g., sound, alarms, noise, tones, etc.) indicating points in time associated with faults or other events. Such an approach allows for surfacing of building timeseries data to a user without requiring the user to repeatedly navigate, zoom in, zoom out, etc. through interface views as would otherwise be required to view a comparable amount of building performance information.

Advantageously, the graphical user interface 700 can "play" a set of timeseries data in a manner similar to how a media player plays an audio file or a video file. For example, in the context of a media player, a video file may include a video track which contains the visual data used to generate the visual images which are presented to the user as well as an audio track which contains the audio data used to generate the audio presented to the user. The video track may include a sequence of video frames, each of which contains the video data to be presented at a given time to form the image presented to the user. The audio track may include a sequence of audio samples which define the loudness information at a particular point in time. A media player may play both the video track and the audio track concurrently and in synchronization with each other (i.e., playing or presenting each frame of the video track and each sample of the audio track in sequence) to generate the audiovisual presentation. While the complete video file may be predefined and/or preloaded into memory prior to beginning playback, the media player advances in time through the temporally arranged video frames and audio samples to present each video frame and audio sample in a particular sequence defined by the video file.

The graphical user interface 700 can play a set of timeseries data by generating an audiovisual presentation based on the values of the individual timeseries that are included. Each timeseries represented in the graphical user interface 700 can be conceptualized as a separate "track" of the timeseries data, similar to how a video file contains separate audio and video tracks. Each time step of the timeseries can be conceptualized as a separate "frame" or "sample" of the track, similar to the video frames of a video file or audio samples of an audio file. The data values of each timeseries at each time step define how that particular timeseries is rendered or presented at each time step shown in the graphical user interface 700. As shown in FIGS. 7A-B, the graphical user interface 700 can present multiple timeseries concurrently by plotting the timeseries data on the same graph or separate graphs which are temporally aligned along their respective time axes (shown as the horizontal axes in FIGS. 7A-B). Different timeseries can be presented or rendered in different ways. For example, some timeseries (e.g., floating point timeseries, numerical timeseries) can be presented as line graphs in which the value of the timeseries at a given time step defines the position of the line on the graph, whereas other timeseries (e.g., binary on/off, fault yes/no, data loss yes/no) can be presented as colored bars that indicate binary values. In some embodiments, some timeseries can be presented as audio data in which a particular sound is emitted corresponding to the value of the timeseries as that sample of the timeseries is played.

In some embodiments, the entire set of timeseries data used to generate the graphical user interface 700 exists prior to playing the timeseries data. For example, the timeseries may be historical data timeseries stored in one or more databases and can be retrieved or downloaded into memory prior to starting playback. In other embodiments, the timeseries data may be partially complete prior to beginning playback and may be streamed into the graphical user interface 700 during playback (e.g., as the data are collected or provided). The graphical user interface 700 can play the timeseries data by presenting portions of the timeseries data in a predefined temporal order corresponding to the time stamps of the timeseries data, similar to how a media player plays a video file by presenting the video frames and audio samples in a predefined temporal order. However, unlike a media player which presents only a single video frame or audio sample at a given time, the graphical user interface 700 may present multiple time steps of the timeseries data concurrently. For example, the graphical user interface 700 may present a window of the timeseries data which includes multiple time steps concurrently. The window may have a specific duration (e.g., one hour, one day, one week, one month, etc.) which can be adjusted via user-facing controls, similar to the time range selection buttons 650 of the graphical user interface 600. The window may continuously slide forward in time during playback, or can jump forward or backward in time when the user interacts with the playback controls 712 (e.g., shift the window forward or backward by one week, one hour, one day, etc.).

During normal playback, the portion of the timeseries data presented to the user may correspond to the portion of the timeseries data that have timestamps within the window. In other words, the graphical user interface 700 may present the timeseries data from the perspective or reference frame of the window as the window slides forward in time. Accordingly, the samples of the timeseries data for a particular time step shown via the graphical user interface 700 may move into and across the window in a direction that corresponds to the time axis of the various graphs (e.g., from right to left in FIGS. 7A-B) such that the timeseries data appear to be sliding across the graphical user interface 700 during normal playback. In addition to the visual presentation of the timeseries data, the graphical user interface 700 may include a synchronized audio presentation of one or more of the timeseries in which a particular audible tone is played when the timestamp of the corresponding sample of the timeseries data reaches a particular location in the window. These and other features of the graphical user interface 700 are described in greater detail below.

As shown in FIGS. 7A-B, the graphical user interface includes a first graph 704, a second graph 706, and a third graph 708. In the example shown, the first graph 704 plots a first point of building timeseries data over time (shown as a secondary chilled water pump command) and the second graph 706 plots a second point of building timeseries data over time (shown as a secondary chilled water pump status). Historical data is displayed in the first graph 704 and the second graph 706, i.e., corresponding to times which have already elapsed, while predicted values for future times can be displayed in other embodiments. As shown, values are plotted at multiple time steps in a displayed time period (e.g., every 15 minutes, every 30 minutes). Due to the length of the time period for which data is available and the space used to display each value, the first graph 704 and the second graph 706 have a width (left-to-right in the example shown) which exceeds a width of the graphical user interface 700 (e.g., a width of a screen of a client device displaying the graphical user interface 700). That is, the first graph 704 and the second graph 706 extend virtually beyond the right and/or left edges of the graphical user interface 700. The first graph 704 and the second graph 706 can be fully represented and populated in video tracks which play over time such that the full graphs are presented bay an end of a presentation.

As illustrated by arrow 711, the first graph 704 and the second graph 706 play as a visual presentation (e.g., video) in which the first graph 704 and the second graph 706 slide right-to-left such that the displayed time period (and associated data) advances in time. Time steps plotted off of the right of the graphical user interface 700 come into view and move toward the left of the screen, with a comparable number of time steps disappear from view off the left edge of the graphical user interface 700. For example, the first graph 704 and the second graph 706 can advance from the view shown in the first frame 701 to the view shown in the second frame 702, where data for relatively later time steps is shown. This advancement of the first graph 704 and the second graph 706 across the graphical user interface 700 allows more data to be seen by a user as compared to a static screen, without requiring the user to navigate, zoom in, zoom out, etc. The first graph 704 and the second graph 706 can move at a same speed to maintain alignment of the horizontal axis (shown as time steps) of the first graph 704 and the second graph 706.

As shown in FIGS. 7A-B, the first graph 704 and the second graph 706 are shaded (colored, highlighted, etc.) to visually distinguish periods of normal operation from periods of faulty operation (e.g., corresponding to occurrence of one or more faults). As shown in the example, normal periods have a white background while faulty periods are marked with a background coloration or pattern (e.g., in period 710). Such shading, coloration, pattern, etc. moves with other portions of the first graph 704 and the second graph 706 as the visual presentation advances across the graphical user interface 700. In some embodiments, the first graph 704, the second graph 706, and the third graph 708 of FIGS. 7A-B are configured in the same or similar manner as the first graph 610, the second graph 612, and/or the third graph 614 of FIG. 6 and described above.

In some embodiments, audio is provided with the visual presentation, for example by causing a speaker of a client device to emit sound based on one or more aspects of the building timeseries data. In some embodiments, a tone is emitted while a fault period (e.g., period 710) is crossing a point or segment of the graphical user interface 700 (e.g., a vertical center line of the graphical user interface 700). An audible cue is thus provided to a user to inform the user that a fault period is being displayed. Such an audible cue may be easier for a user to notice or recognize, especially when the user's attention is not fully on the graphical user interface 700. In some embodiments, a characteristic of the tone emitted is based on a characteristic of the fault. For example, a pitch, duration, volume, timbre, etc. of the sound may vary based on a severity, criticality, degree, type, etc. of a fault. As one example, the pitch and/or volume may increase as a deviation of a measured value from a setpoint or threshold value (e.g., alarm limit) increases. The audio tone may thereby communicate information to a user which is not visually displayed and/or hard to interpret from the visual display. The audio tone may also facilitate use of the graphical user interface 700 by visually-impaired users. The audio tone may sound once at a beginning of display of a fault period or may continue as long as the fault period is moving across a particular part of the graphical user interface 700 and stop once the fault period has moved passed such a point.

The third graph 708 may also be play (advance, etc.) as a visual presentation (e.g., video). The third graph 708 can update by plotting more (e.g., new, updated) values of the graphed variable over time, for example as new data is collected and/or as the time presented by the audio/visual presentation advances. The time span shown on the third graph 708 may be static, with the plotted values updating over time. Accordingly, the second frame 702 shows more values plotted in the third graph 708 as compared to the first frame 701. In some embodiments, a track of the presentation for the third graph 708 is synced with one or more tracks of the presentation for the first graph 704 and/or the second graph 706, such that the added values are coordinated with an aspect of the change in the first graph 704 and/or the second graph 706 as the presentation plays. Dynamic presentation of the variable plotted in the third graph 708 is thereby provided.

The graphical user interface 700 is shown as including playback controls 712, which include buttons to stop/start playing of the audiovisual presentation (advancement of the graphs), jump back in time along the graphs by a week, a day, or an hour, and to jump forward in time along the graphs by a week, a day, or an hour. A user can thus easily find and/or review segments of the audiovisual presentation of particular interest to a user.

The graphical user interface 700 is also shown as including a data aggregation option 714, which provides options relating to the frequency of data displayed on the graph (allowing for longer or shorter timescales and/or higher or lower frequencies to be displayed). Various such customizability can be provided in various embodiments.

Figure 8:
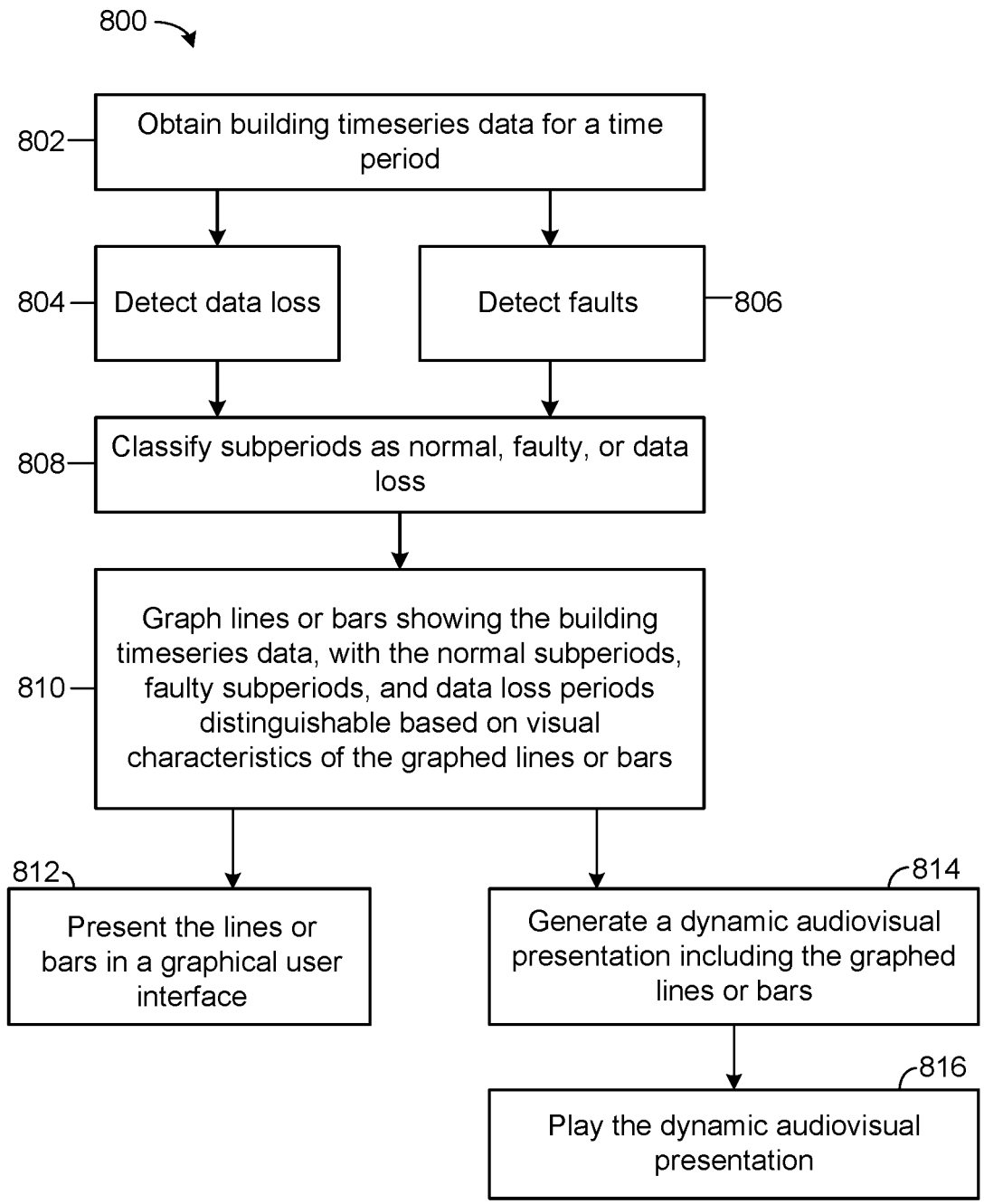
FIG. 8 is a flowchart of a process for presenting building timeseries data including fault information, according to some embodiments.

Referring now to FIG. 8, a flowchart of a process 800 for generating presentations of building timeseries data including fault information is shown, according to some embodiments. Process 800 can output the graphical user interface 600 of FIG. 6 and/or the graphical user interface 700 of FIGS. 7A-B in some embodiments. Process 800 can be executed by processing circuitry programmed to perform the operations of process 800, for example one or more processors in combination with one or more non-transitory computer memory storing instructions which, when executed by the one or more processors, causes the one or more processors to perform the operations of process 800. Such processing circuitry can be included in a building management system, for example in BMS controller 366 (e.g., using fault detection and diagnostics layer 416), in monitoring and reporting applications 422, and/or by system manager 502, in various embodiments. Such processing circuitry may be located at the building for which the building timeseries data is descriptive (e.g., part of BMS controller 366, part of a lower level controller, part of an edge device, etc.), may be remote from such a building (e.g., in a server farm, cloud computing system, etc.), or may be distributed over some combination thereof.

At step 802, building timeseries data is obtained for a time period. The building timeseries data can be obtained from various sensors, equipment, controllers, meters, etc. of a building management system. In some embodiments, the building timeseries data includes one or more virtual points and step 802 includes calculating timeseries values for the one or more virtual points (e.g., based on a combination of measurements/settings/etc., based on estimates, based on modeling, etc.). The building timeseries data can include values for multiple points (e.g., variables, conditions, states, statuses, etc.) for each time step in a time period (e.g., every minute, every 15 minutes, every hour, etc.). Step 802 can include aligning timeseries data to a common sample rate and/or performing other pre-processing steps to improve data quality.

At step 804, data loss, if any, is detected. Data loss refers to periods where data for a point is not available or not reliable, for example due to loss of communications connectivity, communications errors, loss of power to a sensor, etc. Step 804 can include determining time steps for which data is not available for any of the points of the building timeseries data, for all of the points of the building timeseries data, for a particular point of the building timeseries data, etc. in various embodiments. Detecting data loss may include identifying null values for one or more points for one or more time steps. Detecting data loss may include identifying extreme outlier values indicating sensor malfunction, communications failure, etc. (e.g., values of zero for room temperature typically around 60-80 degrees Fahrenheit). Step 804 can include determining a start time and end time of a period of data loss (e.g., between which data is not available or not reliable).

At step 806, one or more faults are detected using the building timeseries data. Faults can include various equipment or system failures or degradations, for example relating to failure of equipment to track a setpoint, broken hardware, inefficiencies, and the like. Step 806 can include running rules-based fault detection logic (e.g., comparing point values to a threshold value, testing a statistical property of a set of point values, etc.), machine learning fault detection logic, or other approach to detecting (and, in some embodiments, diagnosing) faults in the building equipment. Step 806 can be provided using the same or similar algorithms and approaches as described above for FDD layer 416 and/or can be performed by FDD layer 416 in some embodiments. Detecting a fault in step 806 can include determining a start time for the fault and, where applicable, an end time for the fault (e.g., between which the fault is occurring, immediately outside of which the fault is not occurring). Step 806 can include suppressing duplicate faults, determining the criticality or severity of a fault, identifying the equipment associated with a fault, or other features relating to fault detection and diagnosis.

At step 808, subperiods of the time period are classified as normal, faulty, or data loss. A subperiod is classified as a data loss subperiod if data loss occurred for that subperiod, as determined in step 804. For example, the set of time steps that occur between the start times and end times of occurrences of data loss can be classified as data loss subperiods. A subperiod is classified as a faulty subperiod if a fault was detected for the subperiod in step 806. For example, the set of time steps that occur between the start times and end times of occurrences of faults can be classified as faulty subperiods. In some embodiments, a given time step or subperiod can be classified as both a data loss time step or subperiod and a faulty time step or subperiod if the given time step or subperiod meets the criteria of both steps 804 and 806. Other time steps or subperiods may be classified as one of a data loss time step or subperiod or a faulty time step or subperiod, or may not be classified as either a data loss time step or subperiod or a faulty time step or subperiod. After identification of data loss subperiods and faulty subperiods, the remaining subperiods (e.g., time steps between or outside the data loss subperiods and the fault subperiods) are classified as normal. Other classifications can be used in addition or as alternatives to the normal, faulty, and data loss classification of step 808 in other embodiments.

At step 810, lines or bars (or other representations) showing the building timeseries data are graphed (plotted, etc.), with the normal subperiods, faulty subperiods, and data loss periods distinguishable based on visual characteristics of the graphed lines or bars. Step 810 can include generating the graphical user interface 600 as shown in FIG. 6, the graphical user interface 700 as shown in FIGS. 7A-B, or as adapted to show data for another unit or type of equipment, system, or building. Other interfaces, dashboards, visualizations, etc. are also possible within the scope of step 810. The visual characteristics which distinguish the normal subperiods, faulty subperiods, and data loss periods can include color, brightness, thickness, translucency, pattern (e.g., solid, dotted, dashed, combination thereof), etc. Such visual characteristics are direct attributes of the plotted lines/bars of data, such that the subperiod classification is presented without addition of extra lines, text, shading, highlighting, etc. which may otherwise clutter the display and/or obstruct views of data of interest.

Process 800 can then proceed to step 812 and/or step 814. At step 812, the lines or bars generated in step 810 are presented in a graphical user interface, for example as the graphical user interface 600 illustrated in FIG. 6. Step 812 can include providing an interactive dashboard to a user via a client device (e.g., laptop computer, smartphone, tablet, virtual reality headset, etc.). In some embodiments, step 812 includes exporting the lines or bars in a .pdf file, as vector graphics (e.g., a scalable vector graphic (SVG) file or other types of path-based graphics or area-based graphics, an image file (e.g., .png, .jpg), or other format. In some embodiments, step 812 includes controlling a printer to print a page showing the lines or bars.

At step 814, a dynamic audiovisual presentation is generated which includes the graphed lines or bars. The dynamic audiovisual presentation may be similar to the embodiments described with reference to the graphical user interface 700 of FIGS. 7A-B. In some embodiments, the dynamic audiovisual presentation is populated with desired values of the building timeseries data for the time period and with the lines or bars from step 810. In some embodiments, plotted lines or bars may be too long to fit on a screen at one time while preserving a scale that provides a meaningful view to a user (longer than a width of the screen). The dynamic audiovisual presentation can be populated with such lines, with the dynamic audiovisual presentation including continuously sliding such lines or bars across a display window so that each portion of the lines or bars is displayed on the screen for a limited time (i.e., the amount of time required for the portion to slide across the width of the screen) and the full lines or bars (e.g., data for the entire time period) are displayed by an end of the dynamic audiovisual presentation. The dynamic audiovisual presentation generated in step 814 may also include an audio track, for example an audio track based on the subperiod classifications from step 808. For example, the audio track may provide silence during portions of the audiovisual presentation corresponding to normal subperiods and sound (e.g., tones, alarms, beeping, buzzing, notes, voices, etc.) during portions of the audiovisual presentation corresponding to faulty subperiods and/or data loss subperiods (or vice versa). Generating the dynamic audiovisual presentation in step 814 can include selecting a characteristic of the sound for the audio track (e.g., volume, pitch, tone, timbre, etc.) based on a type, severity, or other trait of a corresponding fault.

At step 816, the dynamic audiovisual presentation is played (e.g., on client device). Step 816 can including continuously advancing the graphed lines and/or bars across a display screen, for example such that the time steps of the time period for which building data was obtained in step 802 slide continuously across the display screen. A full set of historical data is thereby displayed over time as the dynamic audiovisual presentation is played. Step 816 may also include playing an audio track of the dynamic audiovisual presentation in sync with the visual track (i.e., synced with movement of the graph lines and/or bars), for example so that sound is emitted according to the audio track at the same time that a fault subperiod (or other feature of a graph) passes through a particular point or region on the display screen (e.g., a middle of the screen, a right edge of the screen, a left edge of the screen, a vertical line designated on the screen, etc.). One or more speakers (speakers, headphones, etc.) can be controlled in step 816 to emit the sound according to the audio track of the dynamic audiovisual presentation. Rich building timeseries data and status information (e.g., normal, data loss, fault, etc.) is thereby communicated to a user in an easy-to-understand manner which does not require scrolling, navigating, zooming in, zooming out, etc. to access all available data.

In some embodiments, the various timeseries presented via the graphical user interfaces 600 and 700 are generated and available prior to receiving a request to generate the graphical user interfaces 600 or 700. For example, the timeseries may be stored in memory locally or remotely and retrieved when a user requests to display the graphical user interface 600 or play the graphical user interface 700. The stored timeseries can include, for example, a fault detection timeseries that indicates whether a particular fault exists or does not exist at each time step of the fault detection timeseries, or a data loss timeseries that indicates whether data loss is present or absent at each time step of the data loss timeseries. Alternatively, one or more of the timeseries presented via the graphical user interfaces 600 and 700 can be generated in real-time during playback or in response to a request to present the graphical user interfaces 600 and 700. For example, the system or component that generates the graphical user interfaces 600 and 700 can perform real-time fault detection or data loss detection on the timeseries data to generate supplemental fault detection timeseries or data loss timeseries in response to a request to generate the graphical user interfaces 600 and 700.

In some embodiments, the audiovisual data presented via graphical user interfaces 600 and 700 can be pre-rendered or pre-generated prior to receiving a request to generate or play the graphical user interfaces 600 and 700. For example, the complete visual presentation of the line graphs and bars shown in the graphical user interface 700 can be pre-rendered (e.g., as an image or vector graphic) prior to beginning playback and the time window can slide forward in time over the pre-rendered visual data during playback. Alternatively, some or all of the audiovisual presentation can be generated or rendered in real-time during playback, for example, as the timeseries data slides into the data window during playback.

The features shown in FIGS. 6-8 and described herein advantageously present fault information and building data in a manner that allows building operations to be assessed and adjusted to improve equipment and system performance. For example, insights can be presented in an understandable manner which helps drive reduction in faults, reduction in equipment downtime, improved maintenance efficiency, reduced energy consumption, etc. Further, the approaches and interfaces described herein solve previous challenges associated with cluttered and obstructed views and with requiring users to perform undesirable amounts of page navigation, scrolling, and zooming, for example by streamlining views, streaming visual presentations, and emitting sound in sync with such data presentation. The teachings herein thus both solve technical challenges associated with surfacing building timeseries data to human users and provide for improved performance of building equipment.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule Based logic and other logic to accomplish the various connection steps, processing steps, comparison steps and decision step.

What is claimed is:

1. A method for a building management system, comprising:
    detecting a fault from timeseries building data;
    classifying a time period of the timeseries building data as a faulty time period responsive to detecting the fault;
    playing an audiovisual presentation of the fault and the timeseries building data via a screen and a speaker by:
        visually advancing through the timeseries building data in a chronological order such that at least a normal time period and the faulty time period are presented at different times, wherein the timeseries building data is presented with different coloring, dashing, or line type in the normal time period as compared to the faulty time period, wherein visually advancing the timeseries building data comprises moving a chart of the timeseries building data across the screen, and wherein a width of the chart exceeds a width of the screen; and
        emitting an audio tone when the timeseries building data for the faulty time period is presented.

2. The method of claim 1, comprising determining a quality of the tone based on a type or severity of the fault.

3. The method of claim 2, wherein the quality of the tone comprises a pitch or volume of the tone.

4. The method of claim 1, wherein a pitch of the tone is a function of an amount of deviation of a point of the timeseries building data from a target or threshold value for the point.

5. The method of claim 1, further comprising stopping the tone when the timeseries building data for the faulty time period is no longer presented.

6. One or more non-transitory computer-readable media storing program instructions that, when executed by one or more processors, cause the one or more processors to perform operations comprising:
    detecting a fault from timeseries building data;
    classifying a time period of the timeseries building data as a faulty time period responsive to detecting the fault;
    playing, by controlling a screen and a speaker, an audiovisual presentation of the fault and the timeseries building data by:
        visually advancing through the timeseries building data in a chronological order, wherein the timeseries building data is presented with different coloring, dashing, or line type in the normal time period as compared to the faulty time period, wherein visually advancing the timeseries building data comprises moving a chart of the timeseries building data across the screen, and wherein a width of the chart exceeds a width of the screen; and
        emitting an audio tone when the timeseries building data for the faulty time period is presented.

7. The one or more non-transitory computer-readable media of claim 6, the operations further comprising determining a pitch of the tone based on a type or severity of the fault.

8. The one or more non-transitory computer-readable media of claim 7, wherein the pitch of the tone is a function of an amount of deviation of a point of the timeseries building data from a threshold or target value for the point.

9. The one or more non-transitory computer-readable media of claim 6, the operations further comprising stopping the tone when the timeseries building data for the faulty time series is advanced such that the timeseries building data is no longer presented.

10. A system, comprising:
    one or more processors; and
    one or more non-transitory computer-readable media storing program instructions that, when executed by the one or more processors, cause the one or more processors to perform operations comprising:
        detecting a fault from timeseries building data;
        classifying a time period of the timeseries building data as a faulty time period responsive to detecting the fault;
        playing, by controlling a screen and a speaker, an audiovisual presentation of the fault and the timeseries building data by:
            visually advancing through the timeseries building data in a chronological order, wherein the timeseries building data is presented with different coloring, dashing, or line type in the normal time period as compared to the faulty time period, wherein visually advancing the timeseries building data comprises moving a chart of the timeseries building data across the screen, and wherein a width of the chart exceeds a width of the screen; and
            emitting an audio tone when the timeseries building data for the faulty time period is presented.

11. The system of claim 10, the operations further comprising determining a pitch of the tone based on a type or severity of the fault.

12. The system of claim 11, wherein the pitch of the tone is a function of an amount of deviation of a point of the timeseries building data from a threshold or target value for the point.

13. The system of claim 10, the operations further comprising stopping the tone when the timeseries building data for the faulty time series is advanced such that the timeseries building data is no longer presented.

* * * * *